(12) United States Patent
Ostaszewski et al.

(10) Patent No.: US 10,591,676 B1
(45) Date of Patent: Mar. 17, 2020

(54) FIBER MICROPOSITIONER

(71) Applicant: Ball Aerospace & Technologies Corp., Boulder, CO (US)

(72) Inventors: Miroslaw A. Ostaszewski, Louisville, CO (US); Robert W. Kaliski, Boulder, CO (US); Robert G. Marshalek, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/212,307

(22) Filed: Dec. 6, 2018

Related U.S. Application Data

(60) Provisional application No. 62/729,025, filed on Sep. 10, 2018.

(51) Int. Cl.
*G02B 6/36* (2006.01)
(52) U.S. Cl.
CPC .................. *G02B 6/3656* (2013.01)
(58) Field of Classification Search
CPC .................................. G02B 6/3656
USPC ........................................ 385/137
See application file for complete search history.

(56) References Cited

U.S. PATENT DOCUMENTS

| | | | |
|---|---|---|---|
| 4,932,210 A | 6/1990 | Julien et al. | |
| 6,327,065 B1 | 12/2001 | Danial et al. | |
| 6,661,962 B1 * | 12/2003 | Calvet | G02B 6/3656 385/134 |
| 6,862,122 B1 | 3/2005 | Moore | |
| 7,227,111 B2 | 6/2007 | Eckelkamp-Baker et al. | |
| 7,538,959 B1 | 5/2009 | Wheeler | |
| 8,724,095 B2 | 5/2014 | Goodwin et al. | |

(Continued)

FOREIGN PATENT DOCUMENTS

EP    3324193    5/2018

OTHER PUBLICATIONS

Allegranza et al. "Actuators for Space Applications: State of the Art and New Technologies," Actuator 2014, 14th International Conference on New Actuators, Jun. 23-25, 2014, Bremen, Germany, pp. 283-288, 38 pages.

(Continued)

*Primary Examiner* — Jerry M Blevins
(74) *Attorney, Agent, or Firm* — Sheridan Ross P.C.

(57) ABSTRACT

A micropositioner is provided. The micropositioner can include a suspension system with a support element that is connected to a base by first and second sets of flexures. The first and second sets of flexures permit movement of the support element within first and second dimensions respectively, while preventing movement of the support element in a third dimension that is orthogonal to the first and second dimensions. More particularly, the first set of flexures can include first and second flexures that are opposite one another and configured such that movement of the support element in the first dimension is allowed, but movement of the support element in the second and third dimensions is prevented. The second set of flexures can include third and fourth flexures that are opposite to one another and configured such that movement of the support element in the second dimension is allowed, but movement in the first and third dimensions is prevented. The micropositioner may be included in a system for pointing a laser beam.

19 Claims, 11 Drawing Sheets

(56) References Cited

U.S. PATENT DOCUMENTS

| | | | |
|---|---|---|---|
| 9,057,610 B2 | 6/2015 | Graesser et al. | |
| 9,880,263 B2 | 1/2018 | Droz et al. | |
| 9,954,612 B1 | 4/2018 | La Fata | |
| 2002/0176683 A1* | 11/2002 | Harman | G02B 6/4226 385/137 |
| 2004/0140737 A1 | 7/2004 | Barillot et al. | |
| 2006/0062528 A1* | 3/2006 | Morris | G02B 6/43 385/90 |
| 2016/0259252 A1 | 9/2016 | Suzuki et al. | |
| 2018/0095223 A1* | 4/2018 | Wiley | F16M 11/12 |

OTHER PUBLICATIONS

Letty et al. "Miniature Piezo Mechanisms for Optical and Space Applications," Actuator 2004, 9th International Conference on New Actuators, Jun. 14-16, 2004, Bremen, Germany, pp. 177-180.

Shimizu et al. "Development of Fine Pointing Mechanism for Optical Inter-Satellite Communication," Proceedings of the International Conference on Space Optical Systems and Applications (ICSOS), May 7-9, 2014, Kobe, Japan, 7 pages.

Syms et al. "Scalable electrothermal MEMS actuator for optical fibre alignment," Journal of Micromechanics and Microengineering, 2004, vol. 14, pp. 1633-1639.

Wang et al. "Four-plate piezoelectric actuator driving a large-diameter special optical fiber for nonlinear optical microendoscopy," Optics Express, Aug. 2016, vol. 24, No. 17, pp. 19949-19960.

Awtar et al. "An XYZ Parallel-Kinematic Flexure Mechanism With Geometrically Decoupled Degrees of Freedom," Journal of Mechanisms and Robotics, Feb. 2013, vol. 5, No. 1, 015001, 8 pages.

International Search Report and Written Opinion for International (PCT) Patent Application No. PCT/US2018/064278, dated Aug. 16, 2019 13 pages.

\* cited by examiner

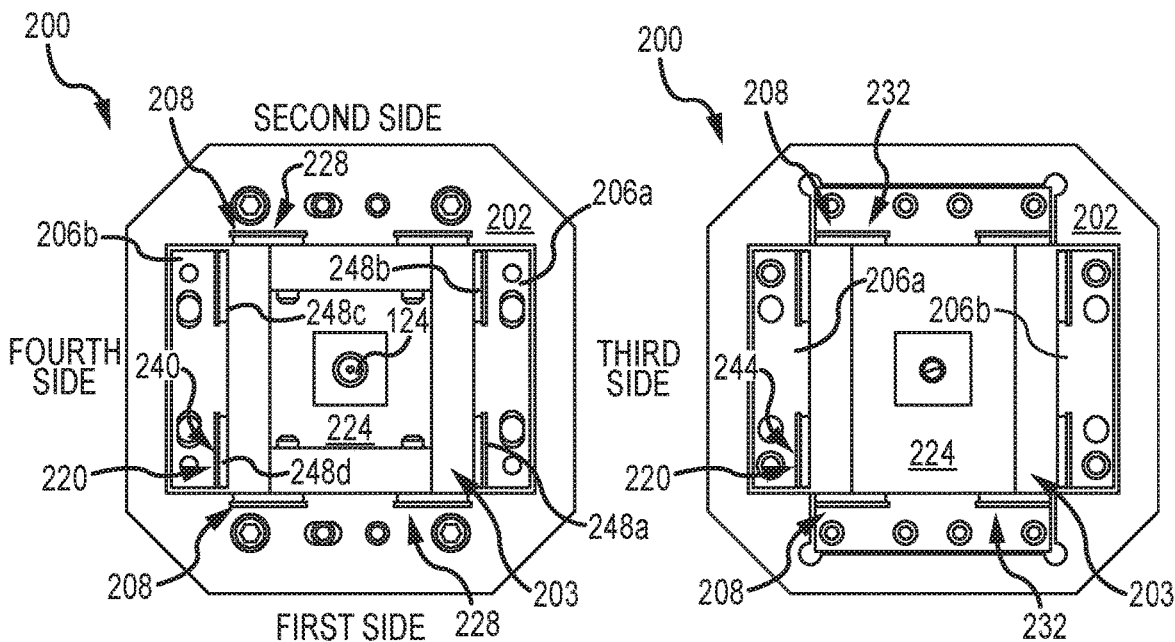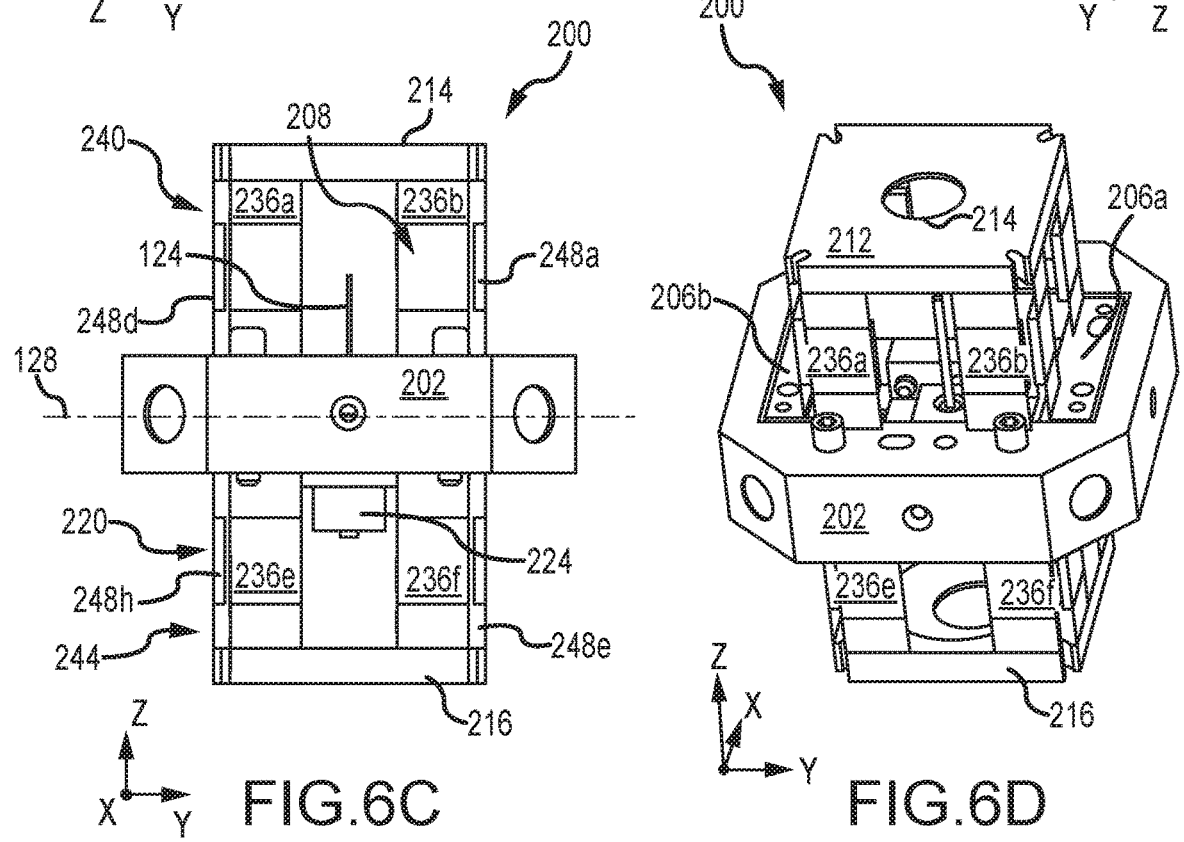

FIBER MICROPOSITIONER

CROSS-REFERENCE TO RELATED APPLICATIONS

This application claims the benefit of U.S. Provisional Patent Application Ser. No. 62/729,025, filed Sep. 10, 2018, the entire disclosure of which is hereby incorporated herein by reference.

FIELD

A micropositioner for positioning a fiber in two dimensions within a plane is provided.

BACKGROUND

It is desirable in various applications to precisely control the pointing of a light or laser beam. For example, various systems, such as laser communication systems, can require pointing a laser beam at a receiver located many miles distant from a source of the laser beam. For such applications, pointing mechanisms incorporating lenses and mirrors have been developed. However, such systems can suffer from transmission inefficiencies. Moreover, such systems can be difficult to control.

In some systems, the controlled pointing of a light beam is accomplished by selectively varying the location on a lens or lens system at which a laser beam is incident. Movement of the laser beam relative to the lens can be accomplished using a support structure that permits controlled movement of an element transmitting the beam, such as an end of an optical fiber. In such systems, it is desirable to provide a support structure that permits movement of the transmitting fiber in a plane, while preventing or constraining such movement in dimensions laying outside of the plane. For example, in a laser communications system, it is desirable to provide pointing of a laser beam with great precision, as small changes at a transmitting node can result in large changes many miles distant at or near a receiving node.

Although mechanisms for enabling the movement of an end of an optical fiber or other object within a plane have been developed, such mechanisms have suffered from various deficiencies. For example, the configuration of such systems has resulted in thermal isolation of at least some of the actuators, making it difficult to adequately cool the affected actuators. This can adversely affect pointing accuracy of the optical fiber as different components of the system may experience wide temperature variations. Materials used in some systems also have fatigue limitations which can decease the life of the system. Finally, the limited range of motion of some prior art system limits the number of applications that can be supported by such systems.

SUMMARY

Embodiments of the present disclosure provide a pointing mechanism for an optical fiber or other element. Embodiments of the present disclosure permit precisely controlled movement of a controlled element, such as an end of an optical fiber, within a plane. Moreover, while movement of the controlled element is allowed in first and second dimensions, movement in a third dimension that is orthogonal to the first and second dimensions is prevented. In accordance with further embodiments of the present disclosure, actuators for effecting movement within the plane are included. More particularly, the actuators are fixed to a base unit, providing favorable heat transfer characteristics. In accordance with still other embodiments of the present disclosure, sensors for detecting a position of a controlled element or suspension structure are provided. The sensors can be located such that they determine the location of the suspension structure directly.

Embodiments of the present disclosure can be applied to a system for aiming a laser beam, such as but not limited to a laser communication system. The system can include a light source and an optical fiber with a receiving end that receives light output by the light source, directly or through one or more intermediate optical elements. A transmitting end of the optical fiber is held in a moveable support element of a micropositioner. Light output from the transmitting end of the optical fiber is passed through a transmitting lens or lens system. As can be appreciated by one of skill in the art after consideration of the present disclosure, changes in the location of the transmitting end of the optical fiber within a plane are transformed to changes in an angle of a beam transmitted by the transmitting lens or lens system.

In accordance with embodiments of the present disclosure, the micropositioner comprises a suspension structure that includes a first set of flexures and a second set of flexures. The first set of flexures permit movement of the support element in a first dimension and resist or prevent movement in a second dimension. The first set of flexures can include first and second flexures. The first and second flexures are opposed to one another and are aligned along a third dimension that is orthogonal to the first and second dimensions, to counteract movement of the support element in the third dimension that would otherwise occur with movement of the support element in the first dimension.

Similarly, the second set of flexures permit movement of the support element in the second dimension and resist or prevent movement in the first dimension. The second set of flexures can include third and fourth flexures. The third and fourth flexures are opposed to one another and are aligned along the third dimension to counteract movement of the support element in the third dimension that would otherwise occur with movement of the support element in the second dimension.

In accordance with at least some embodiments of the present disclosure the first and second sets of flexures are in the form of opposed box flexures. The first and second sets of flexures can be formed of a metallic material. In one embodiment, the first and second sets of flexures comprise titanium or stainless steel.

As an example, but without limitation, the suspension structure can be integrally formed from a single piece of material. For instance, the suspension structure may be formed as a monolithic structure that is manufactured by an Electrical Discharge Machining (EDM) process. As a further example, the suspension structure can be formed as a monolithic structure using an additive manufacturing process.

A micropositioner in accordance with further embodiments of the present disclosure can include a plurality of actuators that are mounted to a base of the micropositioner. In one embodiment, the actuators can move the support element at least approximately +/−100 microns, or greater than approximately +/−120 microns, in the first and second dimensions. At least one actuator or set of actuators can effect movement of the support element of the suspension structure in the first dimension, while a second actuator or set of actuators can effect movement of the support element in the second dimension. In accordance with at least some embodiments of the present disclosure, the actuators are mounted so as to enable heat generated in the actuators to be readily transferred to the base. For example, the actuators can be mounted directly to the base. The actuators can optionally comprise voice coil actuators.

The micropositioner can include four actuators. Two actuators can define a first set of actuators. The first set of actuators can be substantially coaxially aligned. In this manner, the actuators of the first set of actuators can push and pull the support element in the first dimension. Similarly, two actuators of a second set of actuators may also be substantially coaxially aligned and operate together to push and pull the support element in the second dimension.

In accordance with still other embodiments of the present disclosure, the micropositioner can include a plurality of position sensors. The position sensors can be arrayed so as to directly measure a location of the support element. As an example, but without limitation, the position sensors can comprise differential impedance transducers (DITs).

Additional features and advantages of embodiments of the disclosed systems and methods will become more readily apparent from the following description, particularly when taken together with the accompanying drawings.

BRIEF DESCRIPTION OF THE DRAWINGS

FIG. 6A is a top plan view of a portion of a suspension structure of a fiber micropositioner of one embodiment of the present disclosure with a first connecting structure removed for clarity;

FIG. 6B is a bottom plan view of the suspension structure of the fiber micropositioner of FIG. 6A with a second connecting structure removed for clarity;

FIG. 6C is a front elevation view of the suspension structure of the fiber micropositioner of FIG. 6A and illustrating the first and second connecting structures;

FIG. 6D is a perspective view of the suspension structure of the fiber micropositioner of FIG. 6C;

DETAILED DESCRIPTION

Figure 1:
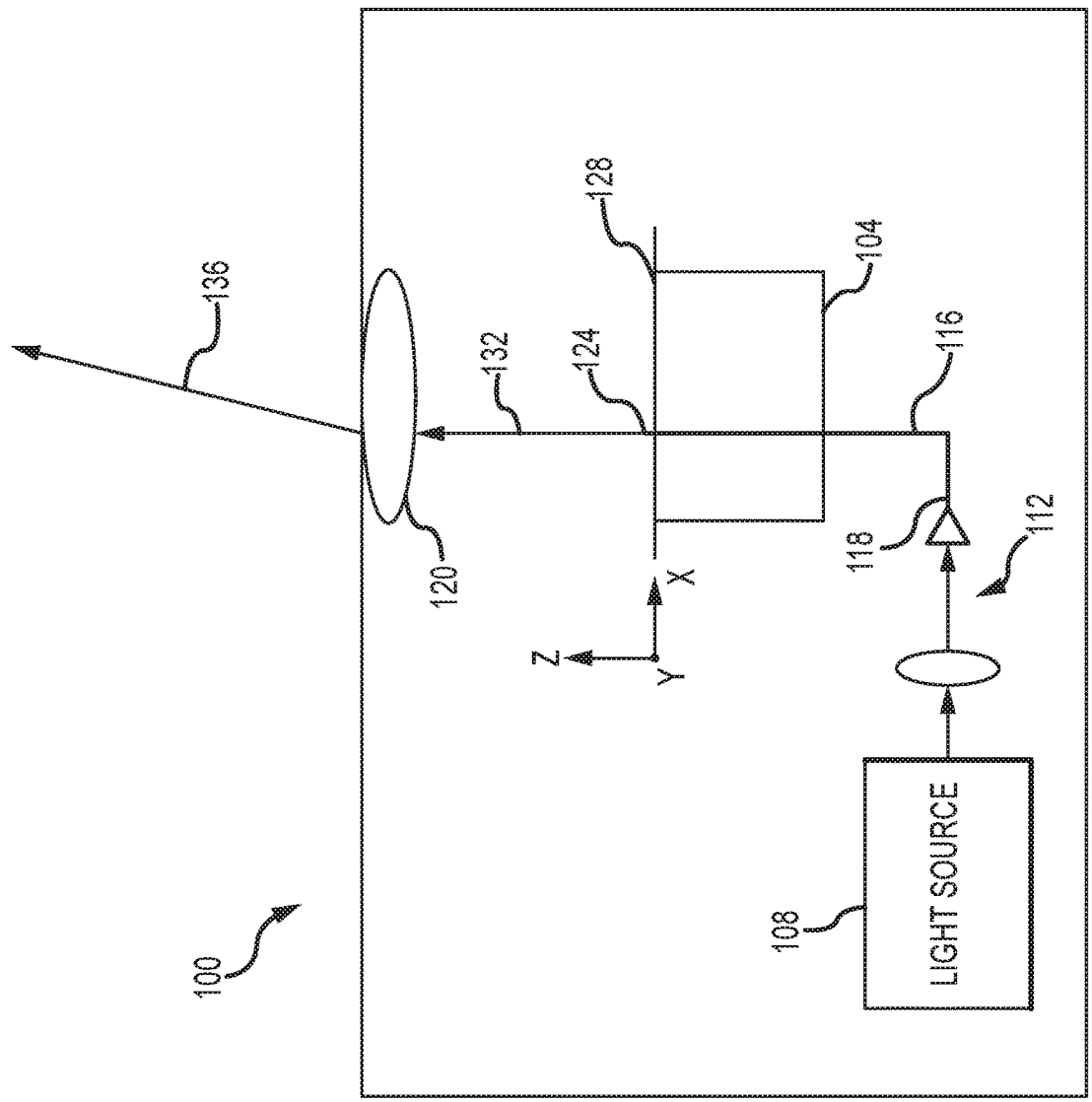
FIG. 1 depicts a system incorporating a fiber micropositioner in accordance with embodiments of the present disclosure.
Figure 2:
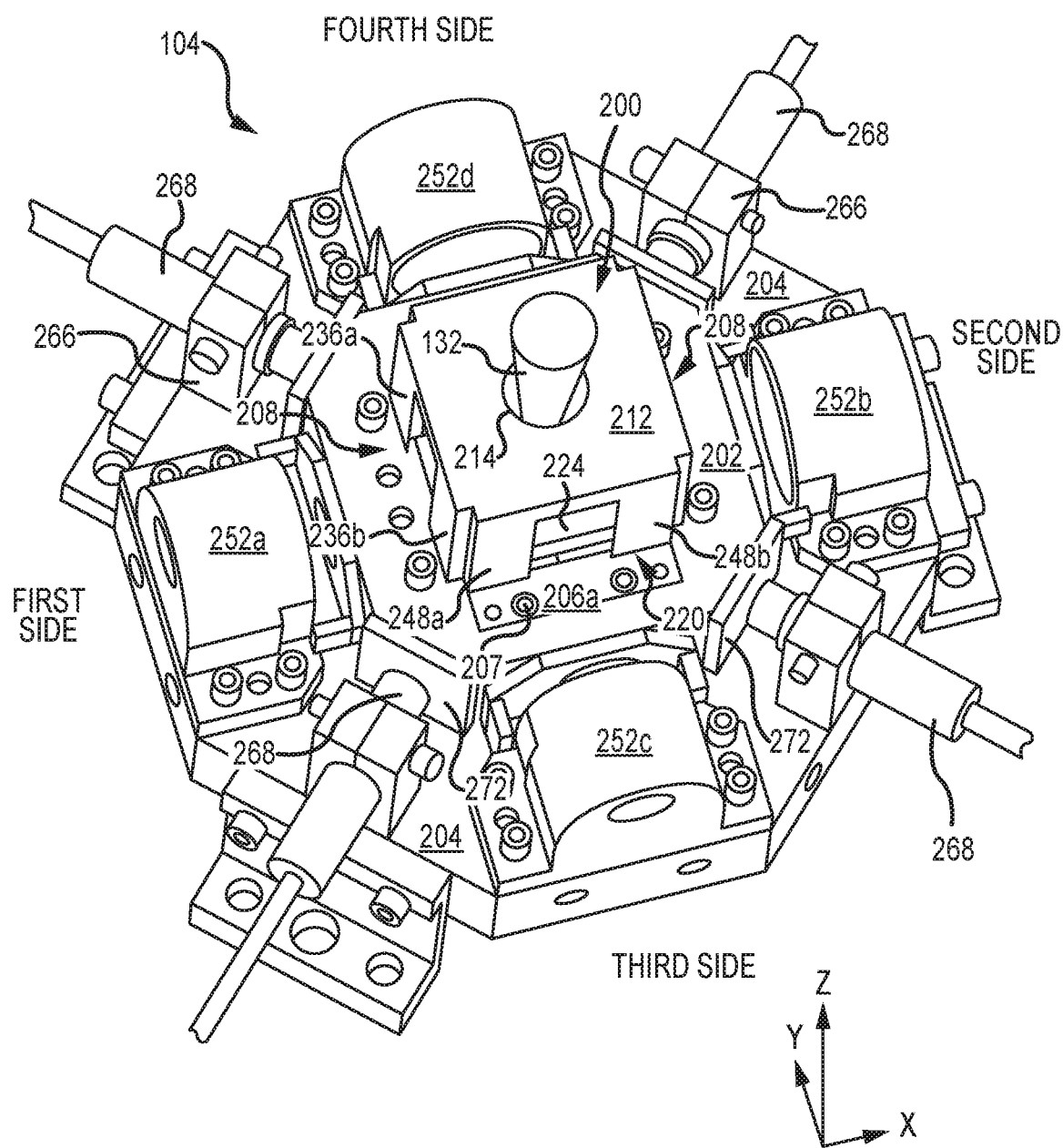
FIG. 2 is a top perspective view of a fiber micropositioner in accordance with embodiments of the present disclosure.
Figure 3:
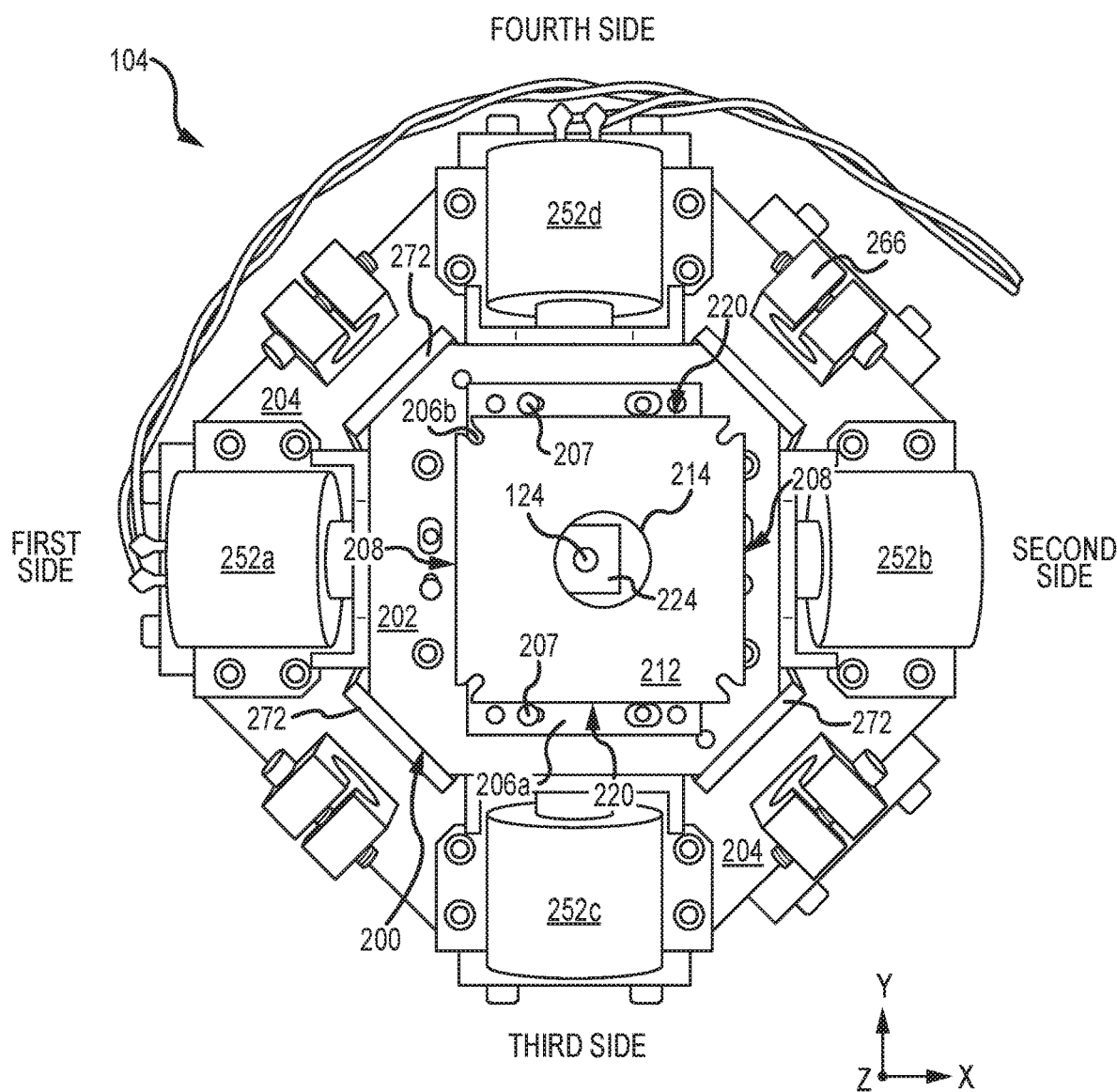
FIG. 3 is a top plan view of a fiber micropositioner in accordance with embodiments of the present disclosure.
Figure 4:
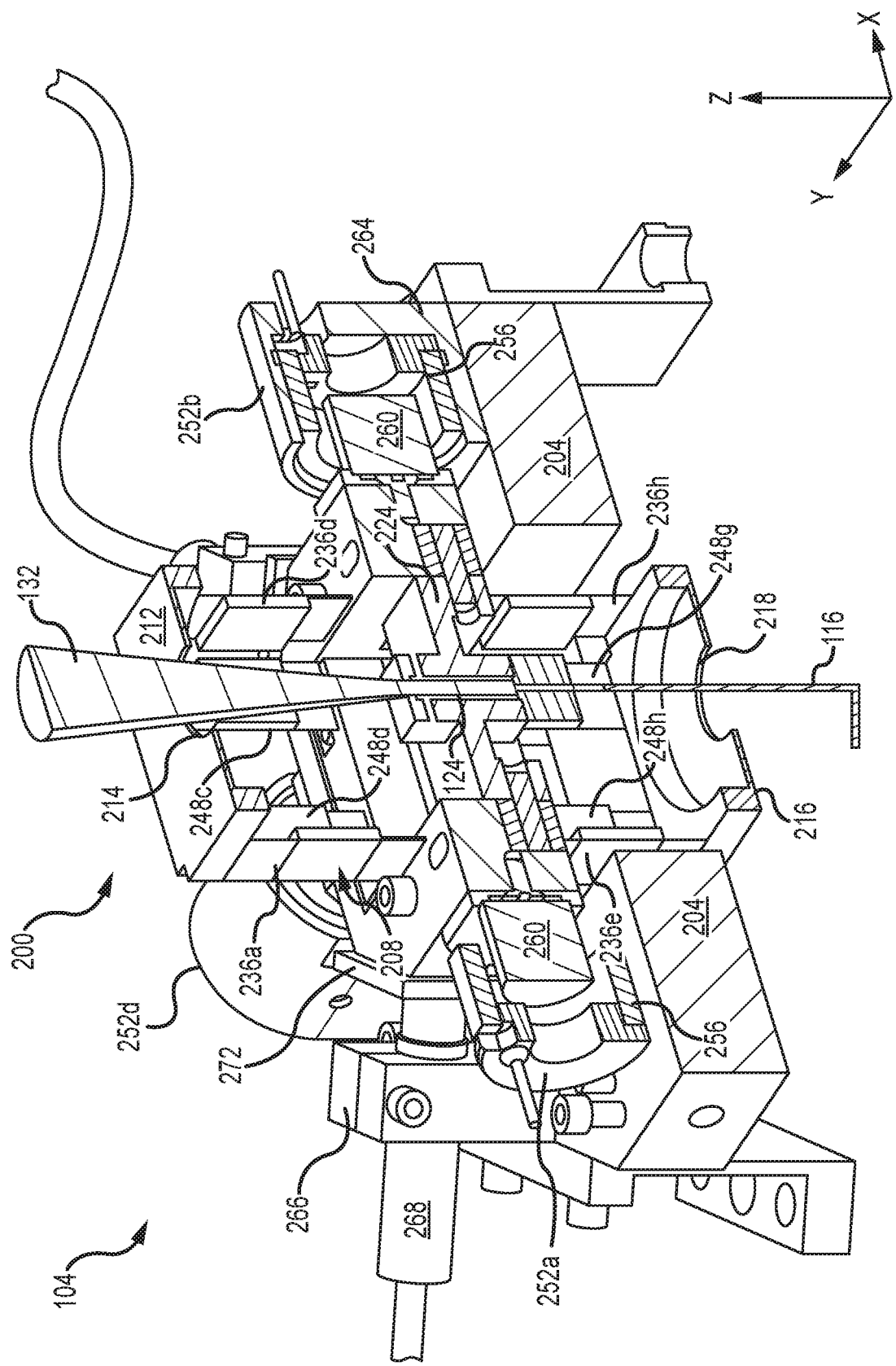
FIG. 4 is a cut-away perspective view of a fiber micropositioner in accordance with embodiments of the present disclosure.
Figure 5B:
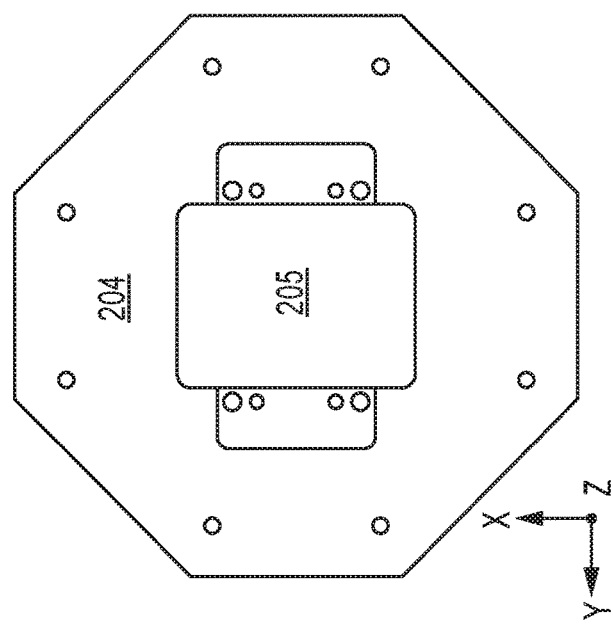
FIG. 5B is a bottom plan view of the base of the fiber micropositioner of FIG. 5A.
Figure 5D:
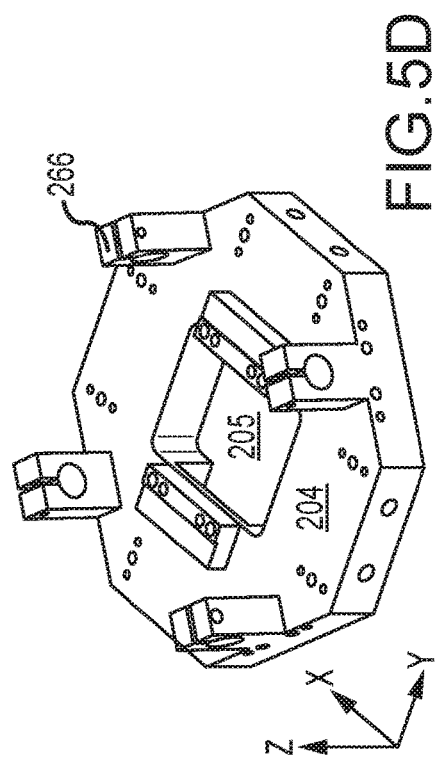
FIG. 5D is a perspective view of the base of the fiber micropositioner of FIG. 5A.
Figure 5A:
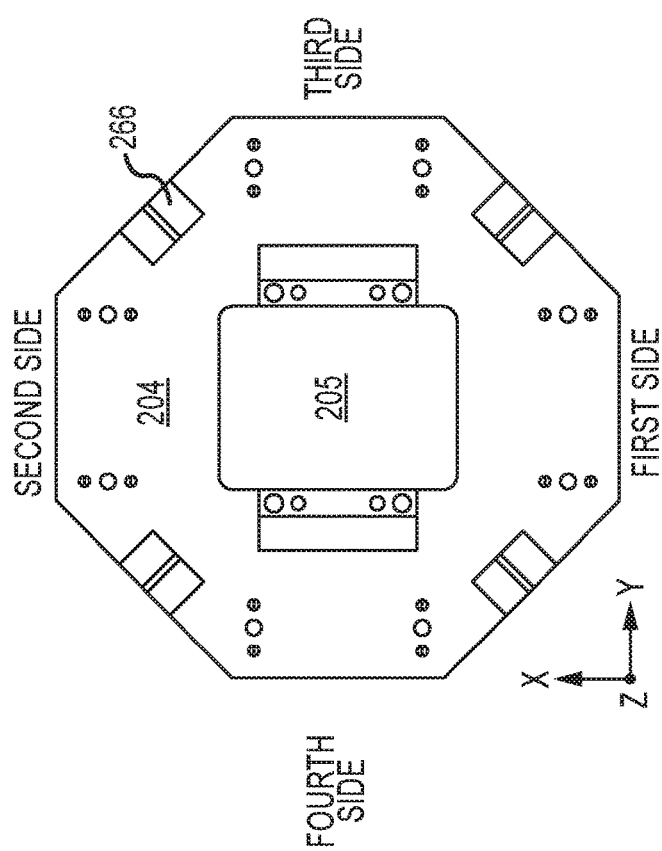
FIG. 5A is a top plan view of a base of a fiber micropositioner of one embodiment of the present disclosure.
Figure 5C:
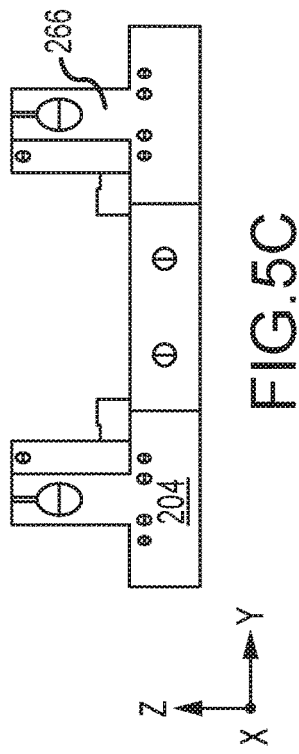
FIG. 5C is a front elevation view of the base of the fiber micropositioner of FIG. 5A.

FIG. 1 is a block diagram that depicts components of a system 100 for pointing a laser beam 136 that incorporates a fiber micropositioner or suspension structure 104 in accordance with embodiments of the present disclosure. The system 100 generally includes a light source or laser 108, a set of receiving optics 112, a transmitting fiber 116 including a receiving end 118 and a transmitting or output end 124, the fiber micropositioner 104, and a set of transmitting optics 120. The fiber micropositioner allows the location of the output end 124 of the transmitting fiber 116 to be moved within a plane 128 defined by or corresponding with X and Y axes. A laser beam 132 is output from the output end 124 along a Z axis that is orthogonal to the plane 128. In addition, the laser beam 132 is incident on the transmitting optics 120. As can be appreciated by one of skill in the art after consideration of the present disclosure, by moving a location of an output end 124 of the transmitting fiber 116 within the plane 128, a location of incidence of the laser beam 132 on the transmitting optics 120 can be changed, which in turn changes an angle of a transmitted beam 136 relative to the system 100. Accordingly, a fiber micropositioner 104 in accordance with embodiments of the present disclosure can be combined with a laser or other light source 108 and a lens system 120 to point a laser beam 136 in the far field. Moreover, a fiber micropositioner 104 as described herein enables precise movements of an output end 124 of a fiber 116 in first and second dimensions (i.e. the dimensions corresponding to the X and Y axes respectively), without introducing movement of the output end 124 of the transmitting fiber 116 in a third dimension (corresponding to the Z axis), to in turn enable the selective pointing of a transmitted beam 136 in azimuth and elevation relative to the system 100.

Referring now to FIGS. 2-6, a fiber micropositioner 104 in accordance with embodiments of the present disclosure is generally illustrated. The fiber micropositioner 104 has a suspension structure 200 and a base 204. The base 204 includes a cutout 205 (best seen in FIG. 5) which receives a portion of the suspension structure.

The suspension structure 200 includes a first mount 202 that is moveable with respect to the base 204. A pair of second mounts 206a, 206b are fixed to the base 204. A first set of flexures 208 connect the first mount 202 to first 212 and second 216 (see FIG. 6C) connecting structures. A second set of flexures 220 connects the first 212 and second 216 connecting structures to the second mounts 206a, 206b which are fixed to the base 204. The second mounts 206 can be fixed to the base 204 by one or more fastener 207, such as a bolt or the like.

As generally illustrated in FIGS. 6A and B, the first mount 202 includes a cavity 203. The support element 224 is positioned within the cavity 203, bifurcating the cavity. Optionally, the support element 224 can be interconnected to or integrally formed with the first mount 202, in which case the cavity is formed as two separate apertures. In one embodiment, the support element 224 extends from a first side to a second side of the suspension structure 200. The second mounts 206a, 206b are positioned in the cavity 203 and spaced from the first mount 202 and the support element 224.

The first connecting structure 212 includes a first aperture 214 to permit transmission of the laser beam 132 from the output end 124 of the transmitting fiber 116 to the transmitting optics 120. A second aperture 218 is formed through the second connecting structure 216 to provide access for the fiber 116 into the suspension structure 200. The apertures 214, 218 can have a generally circular shape. Optionally, the apertures 214, 218 may be of substantially the same size. The first aperture 214 can also be substantially concentric with the second aperture 218.

Figure 7:
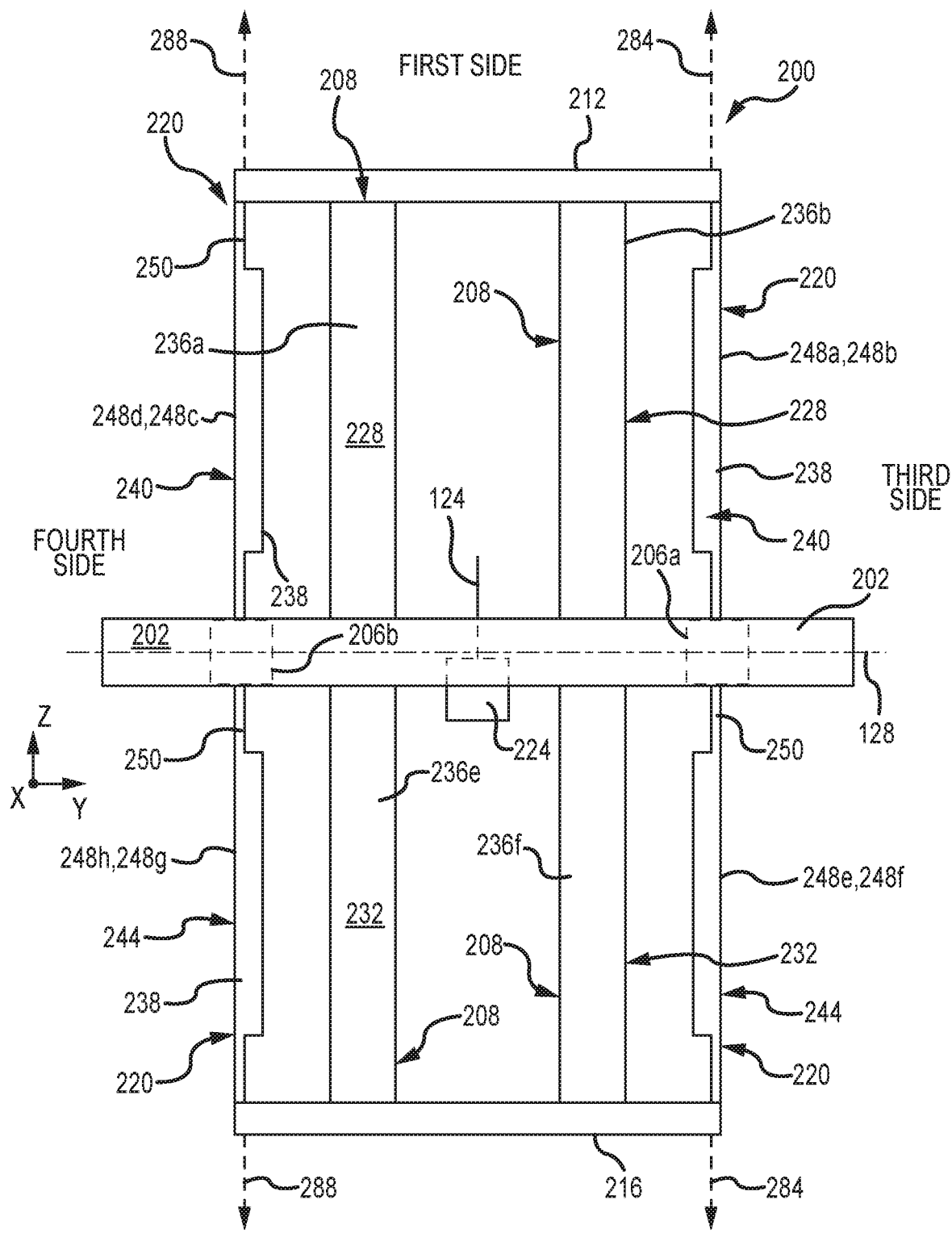
FIG. 7 is a side elevation view of a suspension structure in accordance with embodiments of the present disclosure, taken along the Y axis.
Figure 8:
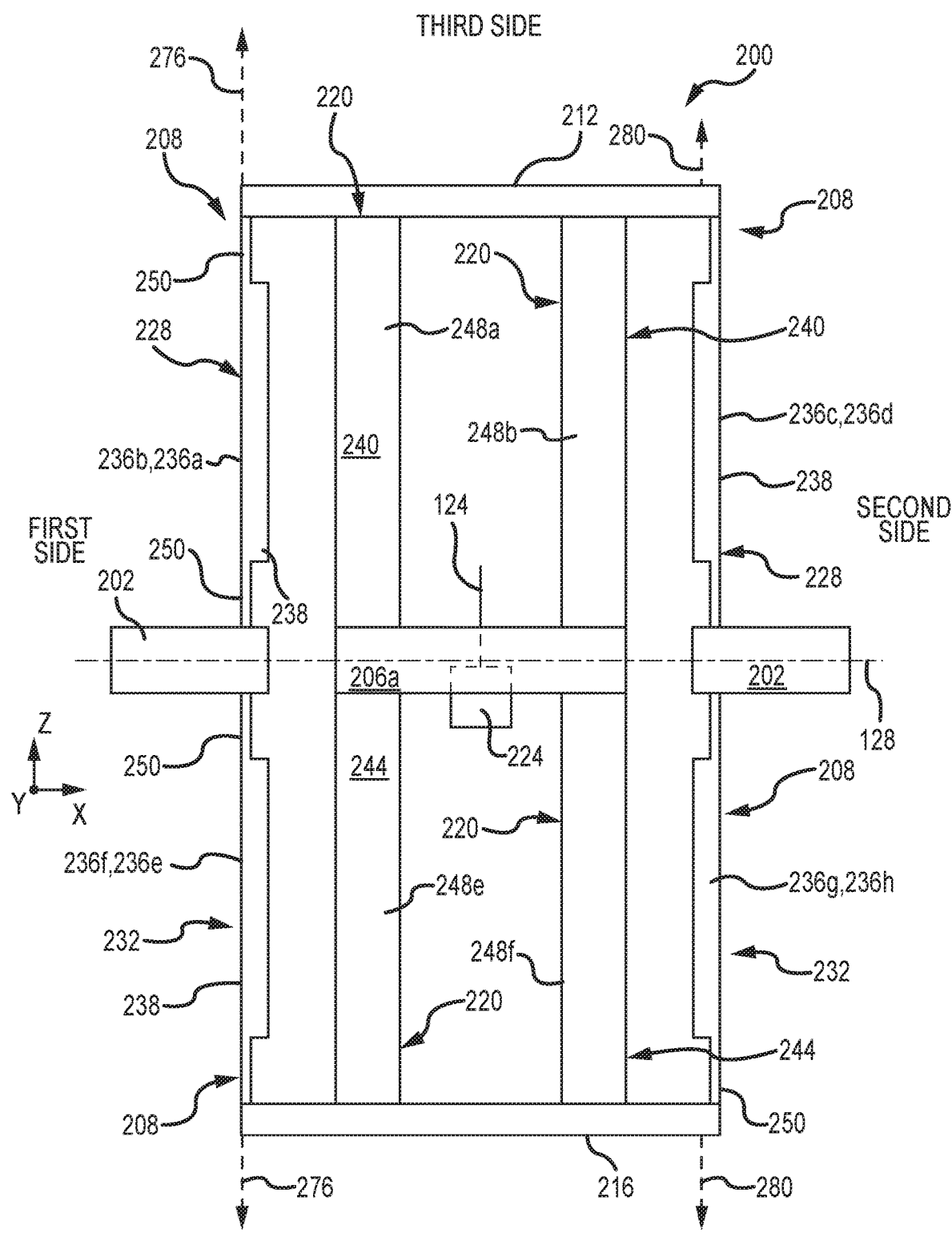
FIG. 8 is a cross-sectional side elevation view of a suspension structure in accordance with embodiments of the present disclosure, taken along the X axis.

As best shown in FIGS. 7 and 8, which depict the suspension structure 200 in elevations taken along the Y and X axes respectively, the first set of flexures 208 includes first 228 and second 232 flexures that are opposed to one another and that extend from opposite sides of the plane 128 defined by the X and Y axes. The first 228 and second 232 flexures of the first set of flexures 208 can each include two or more flexure blades 236. In the example embodiment depicted in the figures, the first flexure 228 includes four blades 236a-d, with first 236a and second 236b of the blades on a first side of the suspension structure 200, and with third 236c and fourth 236d of the blades on a second side of the suspension structure 200. The second flexure 232 includes four blades 236e-h, with first 236e and second 236f of the blades on the first side of the suspension structure 200, and with third 236g and fourth 236h of the blades on the second side of the suspension structure 200. The flexure blades 236a-h of the first flexure 208 are oriented to allow movement of the first 212 and second 216 connecting structures and the support element 224 in a first dimension, which in the illustrated example is coincident with the X axis. The flexure blades 236a-h are configured to resist or prevent movement of the first 212 and second 216 connecting structures in the second dimension, which is coincident with the Y axis in the embodiment illustrated in FIGS. 7 and 8.

The second set of flexures 220 includes third 240 and fourth 244 flexures extending from opposite sides of the plane 128 defined by the X and Y axes. The third 240 and fourth 244 flexures of the second set of flexures 220 can each include two or more flexure blades 248. In the example embodiment depicted in the figures, the third flexure 240 includes four blades 248a-d, with first 248a and second 248b of the blades on a third side of the suspension structure 200, and with third 248c and fourth 248d of the blades on a fourth side of the suspension structure 200. The fourth flexure 244 includes four blades 248e-h, with first 248e and second 248f of the blades on the third side of the suspension structure 200, and with third 248g and fourth 248h of the blades on the fourth side of the suspension structure 200. The flexure blades 248a-h of the second flexure 220 are oriented to allow movement of the support element 224 in a second dimension, which in the illustrated example is coincident with the Y axis. The flexure blades 248a-h are configured to resist or prevent movement of the first 212 and second 216 connecting structures in the first dimension, which is coincident with the X axis in the embodiment illustrated in FIGS. 7 and 8.

In general, the flexure blades 236, 248 are planar when the suspension structure 200 is in a neutral state with the support element 224 substantially centered as illustrated in FIGS. 6-8. The first 228, second 232, third 240, and fourth 244 flexures are generally oriented substantially orthogonal to the plane 128 when the suspension structure 200 is in the neutral state.

As illustrated in FIG. 8, when the suspension structure 200 is in the neutral state, the flexure blades 236a, 236b, 236e, 236f can define a first plane 276. A second plane 280 can be defined by flexure blades 236c, 236d, 236g, 236h. Similarly, as generally shown in FIG. 7, flexure blades 248a, 248b, 248e, 248f can define a third plane 284 and flexure blades 248c, 248d, 248g, 248h can define a fourth plane 288. The first 276, second 280, third 284, and fourth 288 planes can be substantially parallel to the Z axis when the suspension structure 200 is in the neutral state with the support element 224 centered.

In one embodiment, the flexure blades 236, 248 are generally rectangular. However, the flexure blades need not be rectangular. As an example, alternate geometries of the flexure blades 236, 248 include, but are not limited to, hourglass and barrel shapes. The flexure blades 236, 248 may have a substantially constant thickness. Moreover, the flexure blades 236, 248 can have a generally constant width measured orthogonal to the Z axis. However, alternate shapes can be incorporated into any dimension of a flexure blade 236, 248. For example, the flexure blades 236, 248 can optionally include a thick portion 238 and a thin portion 250. In one embodiment, the flexure blades 236, 248 include a thin portion 250 at one or more ends and a median portion that is thick 238. In accordance with still further embodiments of the present disclosure, the flexure blades 236, 248 can have apertures, notches, areas of localized thinning or thickening, or the like. As can be appreciated by one of skill in the art after consideration of the present disclosure, aspects of the flexure blades 236, 248 can be varied and balanced to achieve desired load capacity, bending resistance properties, and to achieve a predetermined mass.

The support element 224 can thus move within the plane 128 defined by the X and Y axes, but not in a third dimension defined by the Z axis that is orthogonal to the plane. Movement of the support element 224, and thus the output end 124 of the transmitting fiber 116, can be effected by a set of actuators 252 (see FIGS. 2-4). In accordance with embodiments of the present disclosure, the actuators 252 are all mounted to the base 204, directly or via a heat transfer element. As shown, at least one actuator 252 can be aligned with each of the X and Y axes. Moreover, as also shown, embodiments of the present disclosure can include multiple actuators 252a-d aligned with each of the X and Y axes in a push/pull configuration. In addition, the actuators can be located within, or parallel to, the X-Y plane 128. In one embodiment, a first pair of the actuators 252a, 252b are positioned to be substantially coaxially aligned along the X axis. Similarly, a second pair of the actuators 252c, 252d can also be substantially coaxially aligned on the Y axis.

The actuators 252 can include a coil 256 that is fixed to the base 204, and a magnet 260 that is fixed to the first mount 202. By locating the coil 256 so that it is in contact with the base 204, either directly or through a support structure 264, efficient thermal conductivity between the actuators 252 and the base 204 can be achieved. The coil 256 can also be stationary with respect to the base 204 to further improve thermal conductivity. In one embodiment, the actuators 252 are voice coil actuators.

In accordance with further embodiments of the present disclosure, the micropositioner 104 includes a plurality of position sensors 268 that are mounted to the base 204 and that are positioned to directly measure the position of the first mount 202 relative to the base 204. Brackets 266 can extend from the base 204 for fixing the position sensors 268 in a predetermined orientation. In this manner, the position sensors can measure movement of the support element 224, which is fixed to the first mount 202. The position sensors 268 in at least some embodiments of the present disclosure are eddy current measurement devices, such as differential impedance transducers (DITs), that measure the strength of an electromagnetic coupling between a sensor 268 and an associated target 272. The targets 272 can be oriented transverse to the X axis and the Y axis. In this manner, a position sensor 268 can detect and measure movement of the first mount 202 and the support element 224 relative to both the X axis and the Y axis. Optionally, the targets 272 can be oriented at approximately 45° relative to the X and Y axes. In one embodiment, the micropositioner 104 includes two pairs of targets. The targets 272 of each pair can be substantially parallel. The targets 272 can be affixed to or integrally formed with the first mount 202.

Figure 9:
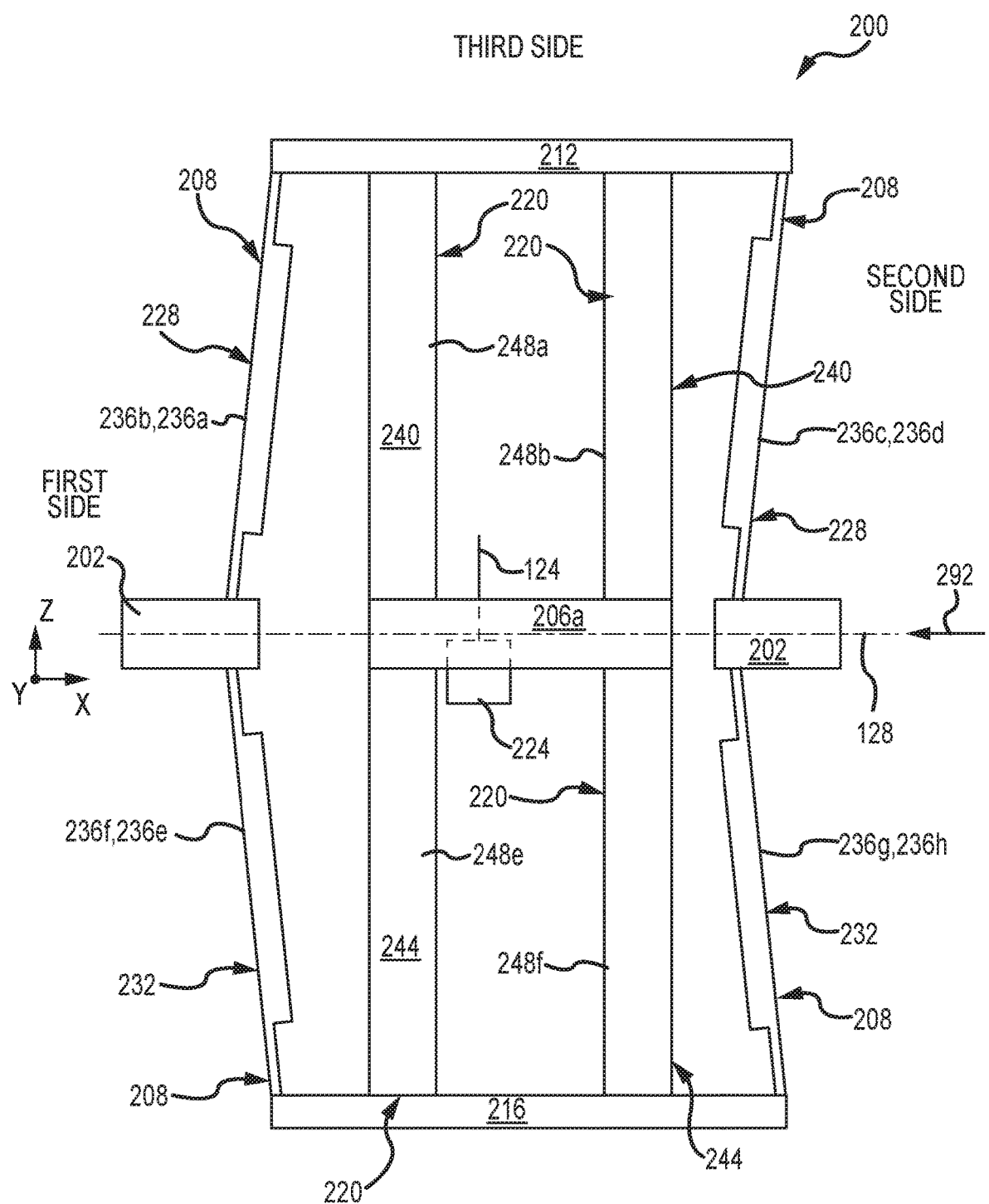
FIG. 9 is a cross-sectional side elevation view of a suspension structure in accordance with embodiments of the present disclosure, taken along the X axis, with a support element in a location that is displaced in a direction along the X axis.

In operation, the actuators 252 can be energized to act on the first mount 202 and to thereby move the location of first mount 202 and of the attached or integral support element 224, and thus the output end 124 of the transmitting fiber 116, in the X-Y plane 128. The precise location of the output end 124 is determined based on measurements from the position sensors 268. Moreover, as the support element 224 is moved within the X-Y plane 128, movement of the support element 224 along the Z axis, which is orthogonal to the X-Y plane 128, is inhibited or prevented. In particular, by providing a first set of opposed flexure pairs 228 and 232, movement of the support element 224 along the X axis, but no other axis, is permitted, and by providing a second set of opposed flexure pairs 240 and 244, movement of the support element 224 along the Y axis, but no other axis, is permitted. This is depicted in FIG. 9, in which the support element 224 is depicted in a position that is shifted in a direction indicated by arrow 292 along the X axis away from a centered position relative to the suspension structure 200. As shown in FIG. 9, the shift in the location of the support element 224 along the X axis is not accompanied by any shift in the location of the support element 224 along the Z axis. An angle of the first 228 and second 232 flexures relative to the plane 128 is shifted from perpendicular to that plane 128 when the support element 224 is displaced from the neutral state (shown in FIG. 9) in the first dimension along the X axis. However, the third 240 and fourth 244 flexures can remain oriented substantially orthogonal to the plane 128 when the support element 224 is substantially centered in the second dimension along the Y axis even when the support element 224 is displaced from the neutral state in the X axis.

Figure 10:
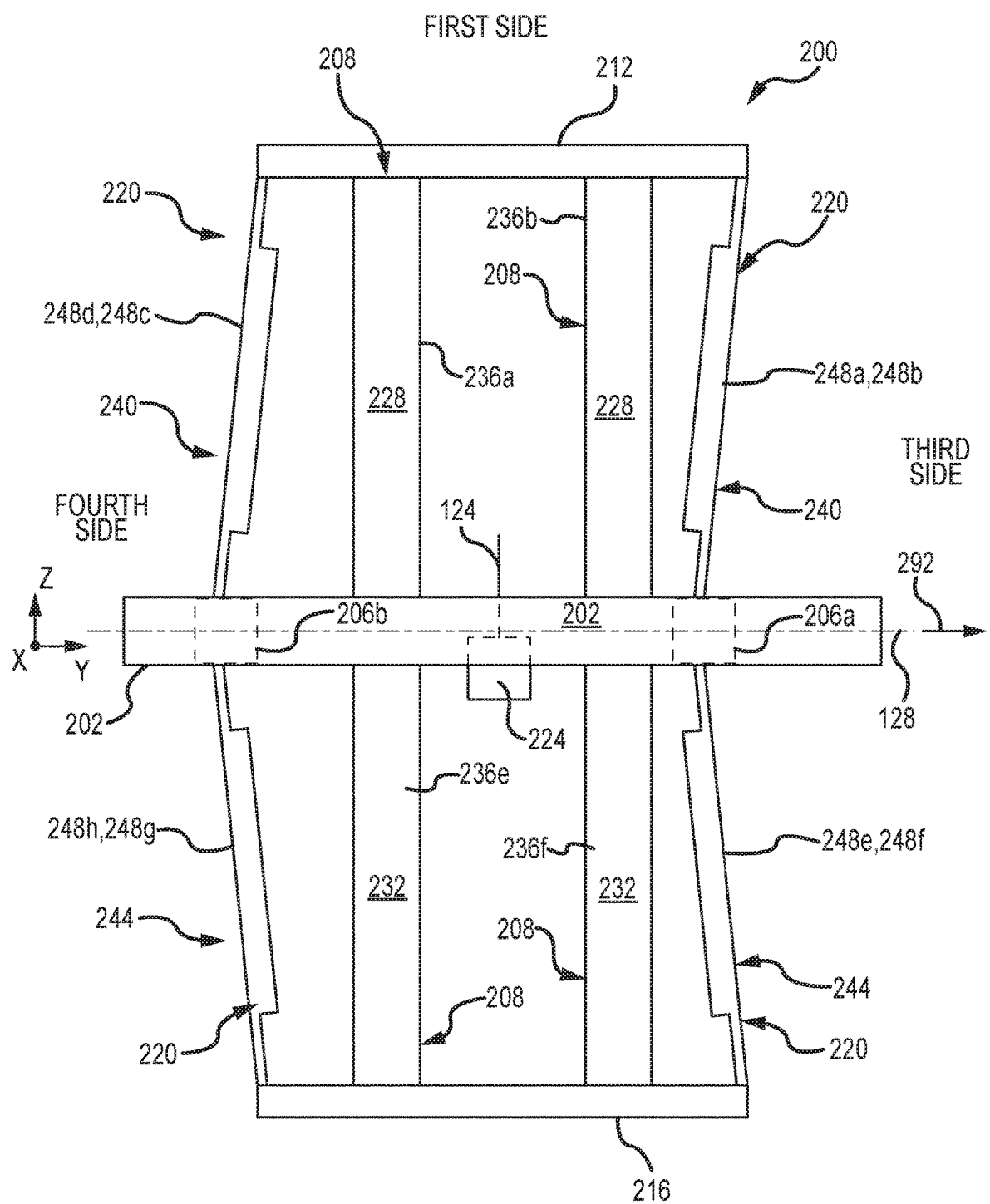
FIG. 10 is a side elevation view of the suspension structure of FIG. 7 with the support element displaced in a direction along the Y axis.

Similarly, as shown in FIG. 10, when the first mount 202 is displaced along the Y axis, the support element 224 can be displayed from the neutral state in the Y axis. Because the second mounts 206a, 206b are fixed to the base 204, the second set of flexures 220 bend and are oriented at a non-orthogonal angle relative to the plane 128. The first set of flexures 208 can remain generally orthogonal to the plane 128 when the first mount 202 is only displaced along the Y axis and centered in the X axis.

As can be appreciated by one of skill in the art after consideration of the present disclosure, a suspension structure 200 as disclosed herein can accommodate shifts in a location of the support element 224 from the neutral state within a plane 128 defined by the X and Y axes. Moreover, the shift along the X, Y, or X and Y axes can be made within the plane 128 without any shifting of the support element along the Z axis.

In accordance with at least some embodiments of the present disclosure, the first 212 and second 216 connecting structures may move orthogonally to the Z axis as the support element 224 shifts along the X and/or Y axes; however, the first and second connecting structures do not twist or tilt relative to the Z axis. More specifically, the first 212 and second 216 connecting structures remain substantially parallel to the plane 128 as the support element 224 shifts within the plane 128.

A suspension structure 200 as disclosed herein can be formed from a unitary piece of material. Similarly, a base 204 of the present disclosure can optionally be formed of a unitary piece of material. For example, the suspension structure 200 and/or the base 204 can formed as an integral structure from a single piece of material. The process used to form the suspension structure 200 or the base 204 can include an electrical discharge machining (EDM) process. As examples, but without limitation, the suspension structure 200 and the base 204 can be formed from a single block of a plastic or a metal, such as aluminum, steel (including stainless steel), or titanium. Forming the suspension structure 200 as a monolithic or integral structure is advantageous in that it avoids the need for joints and the need to weld, braze, bond or otherwise connect individual pieces at such joints. In accordance with further embodiments of the present disclosure, the suspension structure 200 and the base 204 can be formed using an additive manufacturing process.

Figure 11B:
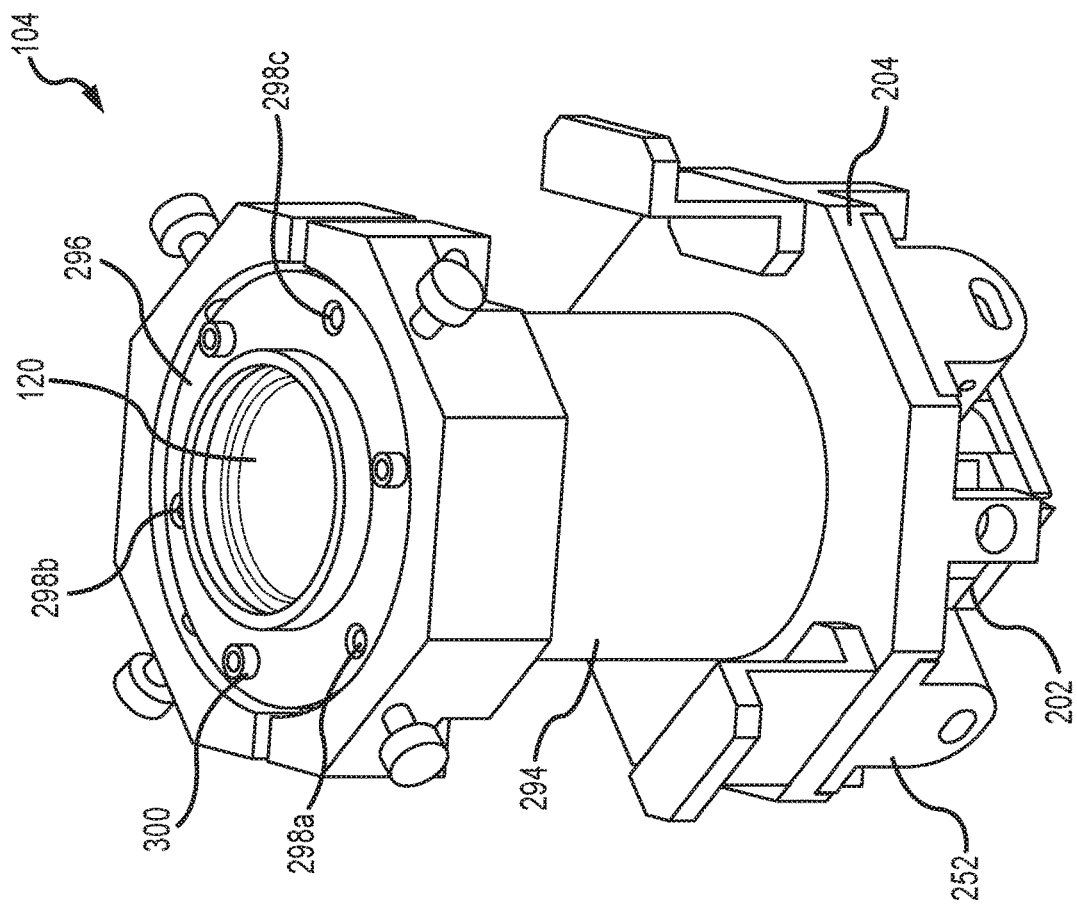
FIG. 11B is a front perspective view of a fiber micropositioner of FIG. 11A in an assembled state.
Figure 11A:
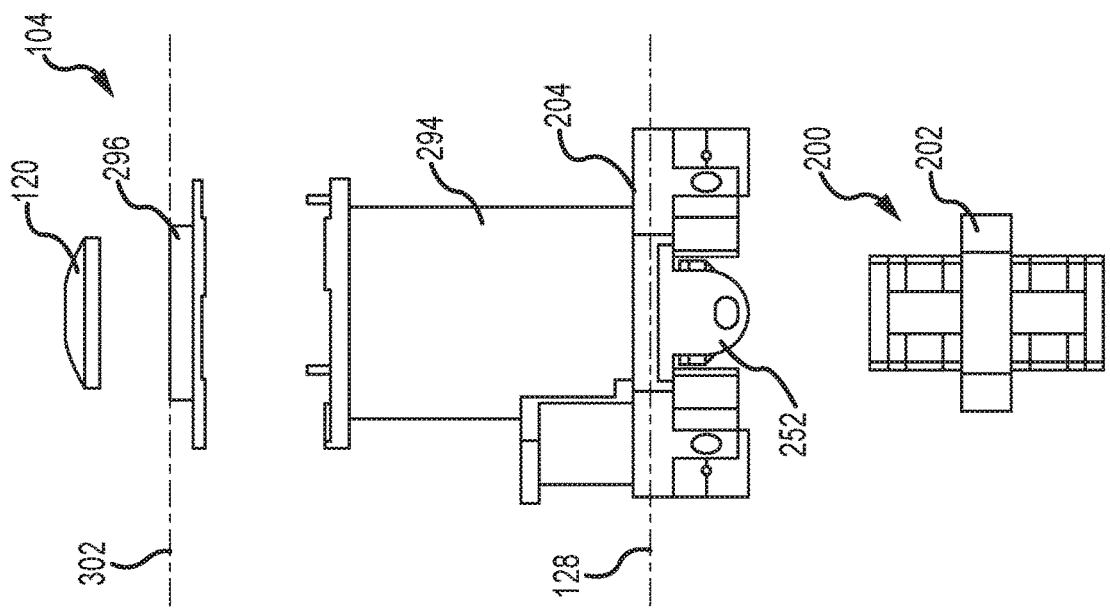
FIG. 11A is an exploded view of a fiber micropositioner of one embodiment of the present disclosure including a lens mount configured to position the transmitting optics in a predetermined orientation with respect to the suspension structure.

Referring now to FIGS. 11A-11B, a micropositioner 104 can optionally include a lens mount 294 configured to retain the transmitting optics 120 in a predetermined orientation with respect to the suspension structure 200. In one embodiment, the lens mount 294 is generally cylindrical and includes an open interior volume for transmission of the laser beam from the output end of the transmitting fiber 116 (illustrated in FIG. 1). The lens mount 294 can be oriented substantially orthogonal to the base 204 and the plane 128 of movement of the support element 224.

A first end of the lens mount 294 can be affixed to the base 204. Alternatively, the lens mount 294 is integrally formed with the base 204. The transmitting optics 120 can be retained proximate to a second end of the lens mount 294. In this manner, the transmitting optics 120 can move with the base 204.

Optionally, the micropositioner 104 can include a bezel 296 to interconnect the transmitting optics 120 to the second end of the lens mount 294. One or more fasteners 300 can be used to interconnect the bezel 296 to the lens mount 294.

The lens mount 294 can be of any predetermined size. In one embodiment, the lens mount 294 has a length configured to position the transmitting optics 120 between approximately 45 mm and approximately 55 mm from the transmitting end of the fiber 116 or from the plane 128. The lens mount can be sized to retain a lens 120 with a diameter of between approximately 5 mm and 20 mm and a thickness of between approximately 2 mm and 10 mm. Optionally, the lens mount 294 can be monolithically formed from a single piece of material. In one embodiment, the lens mount 294 is comprised of a metal, such as titanium.

The bezel 296 can be configured to be tilted relative to the lens mount 294. More specifically, the micropositioner 104 can include a biasing means 298, such as a spring, positioned between the lens mount 294 and the bezel 296. In some embodiment, three springs 298a, 298b, and 298c are provided. In this manner, a plane 302 defined by the bezel 296 can be adjusted relative to the plane 128 of movement of the support element 224. For example, the biasing means 298 can be adjusted to set the plane 302 and the transmitting optics 120 substantially parallel to the plane 128. In one embodiment, the bezel 296 and the transmitting optics 120 can be tilted or tipped +/−50 microradians radially relative to the plane 128.

A micropositioner 104 in accordance with embodiments of the present disclosure can provide infinite fatigue life, a relatively high range of motion, and a high frequency of operation. For example, but without limitation, the micropositioner can provide a +/−120 micron range of motion, and can support operations at a bandwidth of greater than 1300 Hz. Embodiments of the present disclosure can be used in connection with any application in which positioning an element within a plane with a high degree of precision is desired. Example applications include, but are not limited to, beam scanning and low earth orbit (LEO) to geostationary earth orbit (GEO) point ahead operations, as well as LEO to LEO point ahead operations. The micropositioner 104 of the present disclosure can also be used to support nominal point-ahead, beam dither, and nutation applications.

In accordance with at least some embodiments of the present disclosure, the technology encompasses:

(1) A micropositioner, comprising:
 a base; and
 a suspension structure including:
 a first mount that is moveable relative to the base;
 a second mount, wherein the second mount is fixed to the base;
 a first connecting structure;
 a second connecting structure;
 a support element;
 a first set of flexures, wherein the first set of flexures includes a first flexure and a second flexure oriented opposite the first flexure, wherein the first flexure connects the first mount to the first connecting structure, wherein the second flexure connects the first mount to the second connecting structure, wherein the first set of flexures permits movement of the support element relative to the base in a first dimension; and
 a second set of flexures, wherein the second set of flexures includes a third flexure and a fourth flexure oriented opposite to the third flexure, wherein the third flexure connects the first connecting structure to the second mount, wherein the fourth flexure connects the second connecting structure to the second mount, wherein the second set of flexures permits movement of the first and second connecting structures and the support element relative to the base in a second dimension, wherein the first and second dimensions define a plane, wherein the first and second flexures extend from opposite sides of the plane, and wherein the third and fourth flexures extend from opposite sides of the plane.

(2) The micropositioner of (1), wherein the first, second, third, and fourth flexures each include a plurality of blades.

(3) The micropositioner of (1) or (2), wherein the first and third flexures each include at least first and second blades extending from a first side of the plane, and wherein the second and fourth flexures each include at least first and second blades extending from a second side of the plane.

(4) The micropositioner of (3), wherein the first and second blades of each of the flexures are on opposite sides of a center line of the support element.

(5) The micropositioner of (3) or (4), wherein the first and second blades of each of the flexures are substantially parallel when the support element is in a neutral state.

(6) The micropositioner of (1), further comprising a plurality of actuators, wherein each of the actuators are located within the plane.

(7) The micropositioner of (6), wherein at least first and second actuators of the plurality of actuators are aligned with the first dimension, and wherein at least third and fourth actuators of the plurality of actuators are aligned with the second dimension.

(8) The micropositioner of (7), wherein the first and second actuators are substantially coaxially aligned, and wherein the third and fourth actuators are substantially coaxially aligned.

(9) The micropositioner of any of (1) to (8), further comprising a plurality of position sensors, wherein each position sensor is mounted to the base, and wherein each position sensor senses a proximity of a target mounted to the suspension structure.

(10) The micropositioner of any of (1) to (8), wherein the first and second connecting structures are oriented substantially parallel to the plane.

(11) The micropositioner of any of (1) to (10), further comprising a lens mount to retain transmitting optics in a predetermined orientation relative to the base.

In accordance with further aspects of the present disclosure, the technology encompasses:

(12) A system, comprising:
 a light source;
 a base;
 a suspension structure including:
 a first mount moveable relative to the base;
 a second mount fixed to the base;
 a first connecting structure;
 a second connecting structure;
 a support element;
 a first set of flexures that connect the first mount to the first and second connecting structures, wherein the first set of flexures permit movement of the support element relative to the base in a first dimension; and
 a second set of flexures that connect the first and second connecting structures to the second mount, wherein the second set of flexures permit movement of the support element relative to the base in a second dimension, and wherein the first and second dimensions define a plane; and
 an optical fiber including a receiving end to receive light output by the light source and a transmitting end held by the support element such that light output from the transmitting end is oriented substantially orthogonal to the plane.

(13) The system of (12), further comprising at least one of:
 receiving optics positioned between the light source and the receiving end of the optical fiber, and
 transmitting optics spaced from the transmitting end of the optical fiber.

(14) The system of (12) or (13), wherein the first connecting structure includes a first aperture for transmission of light from the transmitting end of the optical fiber.

(15) The system of any of (12) to (14), further comprising:
 a first actuator mounted on a first side of the base, the first actuator configured to apply a force to the first mount that is oriented in the first dimension;
 a second actuator mounted on a second side of the base oriented opposite to the first actuator, the second actuator configured to apply a force to the first mount that is oriented in the first dimension;
 a third actuator mounted on a third side of the base, the third actuator configured to apply a force to the first mount that is oriented in the second dimension; and a fourth actuator mounted on a fourth side of the base oriented opposite to the third actuator, the fourth actuator configured to apply a force to the first mount that is oriented in the second dimension.

(16) The system of (15), wherein the first and second actuators are substantially coaxially aligned, and wherein the third and fourth actuators are substantially coaxially aligned.

(17). The system of any of (12) to (16), wherein the first set of flexures includes a first flexure and a second flexure oriented opposite the first flexure, the first flexure connecting the first mount to the first connecting structure and the second flexure connecting the first mount to the second connecting structure, wherein the second set of flexures includes a third flexure and a fourth flexure oriented opposite to the third flexure, the third flexure connecting the first connecting structure to the second mount and the fourth flexure connecting the second connecting structure to the second mount, and wherein the first and third flexures extend from a first side of the plane and the second and fourth flexures extend from a second of the plane

(18) The system of any of (12) to (17), wherein the first and second sets of flexures are oriented substantially orthogonal to the plane when the support element is in a neutral state.

(19). The system of (18), wherein the first set of flexures are oriented at a non-orthogonal angle relative to the plane when the support element is displaced from the neutral state in the first dimension.

(20) The system of (18) or (19), wherein the second set of flexures are oriented substantially orthogonal to the plane when the support element is substantially centered in the second dimension and displaced from the neutral state in the first dimension.

(21) The system of (12), further comprising a lens mount configured to space transmitting optics a predetermined distance from the transmitting end of the optical fiber.

(22) The system of (21), further comprising a bezel configured to fix the transmitting optics to the lens mount, wherein the bezel can be tilted relative to the lens mount.

In accordance with still further embodiments of the present disclosure, the technology encompasses:

(23) A method of supporting a transmitting end of an optical fiber in a plane, comprising:
affixing a suspension structure to a base, the suspension structure including:
  a first mount moveable relative to the base;
  a second mount affixed to the base;
  a first connecting structure;
  a second connecting structure;
  a support element;
  a first set of flexures that connect the first mount to the first and second connecting structures, wherein the first set of flexures permit movement of the support element relative to the base in a first dimension; and
  a second set of flexures that connect the first and second connecting structures to the second mount, wherein the second set of flexures permit movement of the support element and the first and second connecting structures relative to the base in a second dimension, and wherein the first and second dimensions define the plane; and
fixing the transmitting end of the optical fiber to the support element such that light output from the transmitting end is oriented substantially orthogonal to the plane.

(24) The method of (23), further comprising activating a first actuator to apply a force to the first mount such that the support element is displaced in the first dimension.

(25) The method of (23) or (24), further comprising measuring a location of the first mount relative to the base by a position sensor.

(26) The method of any of (23) to (25), further comprising activating a third actuator to apply a force to the first mount such that the support element is displaced in the second dimension.

(27) The method of any of (23) to (26), further comprising fixing transmitting optics to a lens mount, wherein the lens mount is configured to retain the transmitting optics in a predetermined orientation relative to the transmitting end of the optical fiber.

The foregoing discussion of the invention has been presented for purposes of illustration and description. Further, the description is not intended to limit the various embodiments to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the invention and to enable others skilled in the art to utilize the disclosed systems and methods in such or in other embodiments and with various modifications required by the particular application or use of the systems and methods. It is intended that the appended claims be construed to include alternative embodiments to the extent permitted by the prior art.

What is claimed is:

1. A micropositioner, comprising:
a base; and
a suspension structure including:
  a first mount, wherein the first mount is moveable relative to the base;
  a second mount, wherein the second mount is fixed to the base;
  a first connecting structure;
  a second connecting structure;
  a support element fixed to the first mount;
  a first set of flexures, wherein the first set of flexures includes a first flexure and a second flexure oriented opposite the first flexure, wherein the first flexure connects the first mount to the first connecting structure, wherein the second flexure connects the first mount to the second connecting structure, wherein the first set of flexures permits movement of the support element relative to the base in a first dimension; and
  a second set of flexures, wherein the second set of flexures includes a third flexure and a fourth flexure oriented opposite to the third flexure, wherein the third flexure connects the first connecting structure to the second mount, wherein the fourth flexure connects the second connecting structure to the second mount, wherein the second set of flexures permits movement of the first and second connecting structures and the support element relative to the base in a second dimension, wherein the first and second dimensions along which the support element moves define a plane, wherein the first and second flexures extend from opposite sides of the plane, wherein the third and fourth flexures extend from opposite sides of the plane, wherein the first connecting structure is on a first side of the plane, and wherein the second connecting structure is on the second side of the plane.

2. The micropositioner of claim 1, wherein the first, second, third, and fourth flexures each include a plurality of blades.

3. The micropositioner of claim 2, wherein the first and third flexures each include at least first and second blades extending from a first side of the plane, and wherein the second and fourth flexures each include at least first and second blades extending from a second side of the plane.

4. The micropositioner of claim 3, wherein the first and second blades of each of the flexures are on opposite sides of a center line of the support element.

5. The micropositioner of claim 3, wherein the first and second blades of each of the flexures are substantially parallel when the support element is in a neutral state.

6. The micropositioner of claim 1, further comprising a plurality of actuators, wherein each of the actuators is located within the plane.

7. The micropositioner of claim 6, wherein at least first and second actuators of the plurality of actuators are aligned with the first dimension, and wherein at least third and fourth actuators of the plurality of actuators are aligned with the second dimension.

8. The micropositioner of claim 7, wherein the first and second actuators are substantially coaxially aligned, and wherein the third and fourth actuators are substantially coaxially aligned.

9. The micropositioner of claim 7, further comprising a plurality of position sensors, wherein each position sensor is mounted to the base, and wherein each position sensor senses a proximity of a target mounted to the suspension structure.

10. The micropositioner of claim 1, wherein the first and second connecting structures are oriented substantially parallel to the plane.

11. A system, comprising:
    a light source;
    a base;
    a suspension structure including:
        a first mount moveable relative to the base;
        a second mount fixed to the base;
        a first connecting structure;
        a second connecting structure;
        a support element fixed to the first mount;
        a first set of flexures including a first flexure that connects the first mount to the first connecting structure and a second flexure that connects the first mount to the second connecting structure, wherein the first set of flexures permit movement of the support element relative to the base in a first dimension; and
        a second set of flexures including a third flexure that connects the first connecting structure to the second mount and a fourth flexure that connects the second connecting structure to the second mount, wherein the second set of flexures permit movement of the support element relative to the base in a second dimension, wherein the first and second dimensions define a plane, wherein the first connecting structure is on a first side of the plane, and wherein the second connecting structure is on a second side of the plane; and
    an optical fiber including a receiving end to receive light output by the light source and a transmitting end held by the support element such that light output from the transmitting end is oriented substantially orthogonal to the plane.

12. The system of claim 11, further comprising at least one of:
    receiving optics positioned between the light source and the receiving end of the optical fiber, and
    transmitting optics spaced from the transmitting end of the optical fiber.

13. The system of claim 11, wherein the first connecting structure includes a first aperture for transmission of light from the transmitting end of the optical fiber.

14. The system of claim 11, further comprising:
    a first actuator mounted on a first side of the base, the first actuator configured to apply a force to the first mount that is oriented in the first dimension;
    a second actuator mounted on a second side of the base oriented opposite to the first actuator, the second actuator configured to apply a force to the first mount that is oriented in the first dimension;
    a third actuator mounted on a third side of the base, the third actuator configured to apply a force to the first mount that is oriented in the second dimension; and
    a fourth actuator mounted on a fourth side of the base oriented opposite to the third actuator, the fourth actuator configured to apply a force to the first mount that is oriented in the second dimension.

15. The system of claim 14, wherein the first and second actuators are substantially coaxially aligned, and wherein the third and fourth actuators are substantially coaxially aligned.

16. The system of claim 11, wherein the first and second sets of flexures are oriented substantially orthogonal to the plane when the support element is in a neutral state.

17. The system of claim 16, wherein the first set of flexures is oriented at a non-orthogonal angle relative to the plane when the support element is displaced from the neutral state in the first dimension.

18. The system of claim 16, wherein the second set of flexures is oriented substantially orthogonal to the plane when the support element is substantially centered in the second dimension and displaced from the neutral state in the first dimension.

19. A method of supporting a transmitting end of an optical fiber in a plane, comprising:
    affixing a suspension structure to a base, the suspension structure including:
        a first mount moveable relative to the base;
        a second mount fixed to the base;
        a first connecting structure;
        a second connecting structure;
        a support element fixed to the first mount;
        a first set of flexures that connects the first mount to the first and second connecting structures, wherein the first set of flexures permits movement of the support element relative to the base in a first dimension; and
        a second set of flexures that connects the first and second connecting structures to the second mount, wherein the second set of flexures permits movement of the support element and the first and second connecting structures relative to the base in a second dimension, wherein the first and second dimensions along which the support element moves define the plane, wherein the first and second sets of flexures prevent movement of the support element relative to the base in a third direction that is orthogonal to the plane; and fixing the transmitting end of the optical fiber to the support element such that light output from the transmitting end is oriented substantially orthogonal to the plane.

* * * * *